United States Patent [19]

Ogura et al.

[11] Patent Number: 5,302,157
[45] Date of Patent: Apr. 12, 1994

[54] LIGHTWEIGHT V-GROOVED PULLEY

[75] Inventors: Ken-ichi Ogura; Tomokazu Kawamura, both of Tokyo; Yukio Kanemitsu, Hyogo, all of Japan

[73] Assignees: Furukawa Aluminum Co., Ltd., Tokyo; Kabushiki Kaisha Kanemitsu, Hyogo, both of Japan

[21] Appl. No.: 901,890

[22] Filed: Jun. 22, 1992

[30] Foreign Application Priority Data

Jun. 21, 1991 [JP] Japan .................. 3-177119

[51] Int. Cl.$^5$ ............................................ F16H 55/36
[52] U.S. Cl. ..................... 474/166; 164/481
[58] Field of Search ............... 474/166, 168, 170, 174; 29/893, 894; 414/744.5; 164/476, 481

[56] References Cited

U.S. PATENT DOCUMENTS

| | | |
|---|---|---|
| D. 308,013 | 5/1990 | Kanemitsu . |
| 4,483,751 | 11/1984 | Murayama et al. .......... 204/37.1 |
| 4,518,374 | 5/1985 | Kanemitsu . |
| 4,537,243 | 8/1985 | Hazelett et al. .............. 164/481 |
| 4,614,224 | 9/1986 | Jeffrey et al. ................ 164/476 |
| 5,049,029 | 9/1991 | Mitsui et al. ................ 414/744.5 |
| 5,147,248 | 9/1992 | Lewis et al. ................. 474/166 |

*Primary Examiner*—Thuy M. Bui
*Attorney, Agent, or Firm*—Thomas R. Morrison

[57] ABSTRACT

A lightweight V-grooved pulley obtained from a metal plate and having a cylindrical member with one open end, the cylindrical member having a circumferential surface formed with at least one groove having a substantially V-shaped section is provided in which the material of the metal plate consists of an aluminum alloy containing 2 to 6 wt% of Mg, at least one of 0.005 to 0.2 wt % of Ti, and 0.0005 to 0.02 wt % of B, impurities containing not more than 0.2 wt % of Si, not more than 0.2 wt % of Fe, and not more than 0.5 wt % of Zn, and a balance consisting of Al and an inevitable impurity, and an anodized film is formed on a region including the groove. The material of the metal plate may additionally contain at least one element selected from the group consisting of 0.01 to 2.0 wt % of Cu, 0.02 to 1.0 wt % of Cr, and 0.01 to 0.3 wt % of Zr.

6 Claims, 2 Drawing Sheets

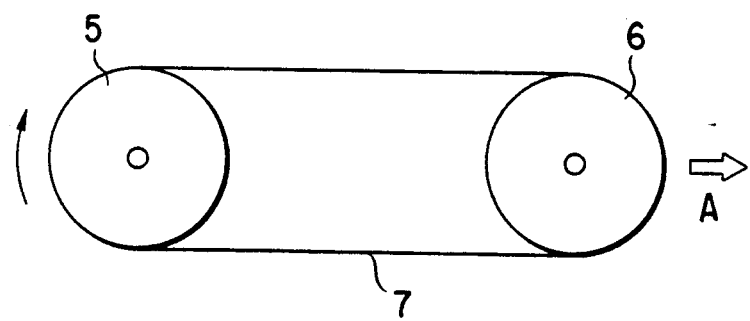
F I G. 3

LIGHTWEIGHT V-GROOVED PULLEY

BACKGROUND OF THE INVENTION

1. Field of the Invention

The present invention relates to a lightweight V-grooved pulley and, more particularly, to a lightweight V-grooved aluminum alloy pulley easily formed from plate and having a high mechanical strength, in which the V-grooved portion has excellent wear resistance.

2. Description of the Related Art

A so-called V-grooved pulley 1 having a substantially V-shaped section, as shown in FIG. 1, is conventionally manufactured in accordance with two methods. According to the first method, a steel mass is cut to obtain a final shape as shown in FIG. 1. According to the second method, a steel plate is worked out as shown in FIGS. 2A to 2E. A steel plate blank 20 as shown in FIG. 2A is drawn to form a cylindrical member 21 having one open end, as shown in FIG. 2B, and the cylindrical member 21 is further drawn to fabricate a cup-shaped member 22 as shown in FIG. 2C. A circumferential surface 22a of the cup-shaped member 22 is subjected to rotational formation to form grooves 23 each having a substantially V-shaped section to obtain a final V-grooved pulley in which a bottom surface 22b of the cup-shaped member 22 has a disk-like shape, as shown in FIGS. 2D and 2E. According to the second method, a lighter V-grooved pulley can be obtained compared to the first method, since the pulley is fabricated from the steel plate. However, a further decrease in weight of the V-grooved pulley is demanded. To meet this demand, a method of using a high-strength material to decrease the thickness or a method of substituting a steel with a lighter material may be possible.

In general, however, when the strength of the material is increased, formability is degraded; when the formability of the material is improved, the mechanical strength is decreased, leading to a contradictory problem. Hence, a lightweight V-grooved pulley satisfying the both characteristics does not conventionally exist.

SUMMARY OF THE INVENTION

It is, therefore, an object of the present invention to provide a lightweight V-grooved pulley easily formed (by drawing and rotational forming) from a plate and having a high mechanical strength, and particularly a high rotational bending fatigue resistance, in which the V-grooved portion has excellent wear resistance.

This object can be achieved by the first aspect of the present invention providing a lightweight V-grooved pulley obtained from a metal plate and having a cylindrical member with one open end, the cylindrical member having a circumferential surface formed with at least one groove having a substantially V-shaped section, wherein a material of the metal plate essentially consists of an aluminum alloy containing 2 to 6 wt % of Mg, at least one of 0.005 to 0.2 wt % of Ti, and 0.0005 to 0.02 wt % of B, impurities containing not more than 0.2 wt % of Si, not more than 0.2 wt % of Fe, and not more than 0.5 wt % of Zn, and a balance consisting of Al and an inevitable impurity, and an anodized film is formed on a region including the groove.

This object can also be achieved by the second aspect of the present invention providing a lightweight V-grooved pulley obtained from a metal plate and having a cylindrical member with one open end, the cylindrical member having a circumferential surface formed with at least one groove having a substantially V-shaped section, wherein a material of the metal plate essentially consists of an aluminum alloy containing 2 to 6 wt % of Mg, at least one element selected from the group consisting of 0.01 to 2.0 wt % of Cu, 0.02 to 1.0 wt % of Cr, and 0.01 to 0.3 wt % of Zr, at least one of 0.005 to 0.2 wt % of Ti and 0.0005 to 0.02 wt % of B, impurities containing not more than 0.2 wt % of Si, not more than 0.2 wt % of Fe, and not more than 0.5 wt % of Zn, and a balance consisting of Al and an inevitable impurity, and an anodized film is formed on a region including the groove.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a schematic view for explaining a rotational bending fatigue resistance test.

DETAILED DESCRIPTION OF THE PREFERRED EMBODIMENT

Figure 1:
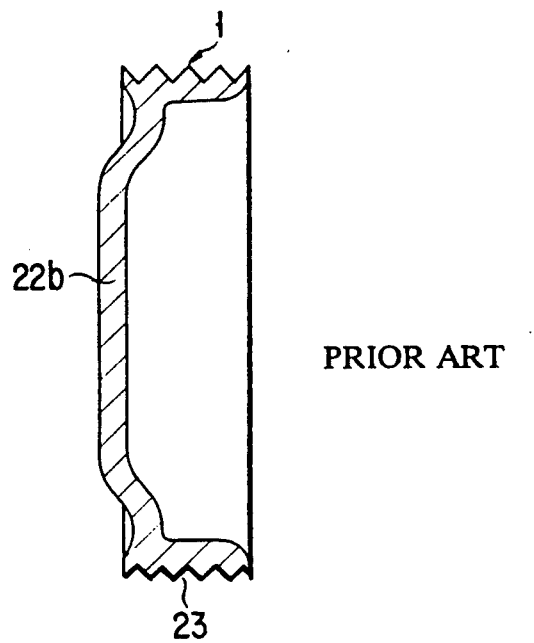
FIG. 1 is a sectional view showing a V-grooved pulley,.

In the present invention, the composition of an aluminum alloy constituting the V-grooved pulley is defined due to the following reason.

In the first and second aspects of the present invention, Mg is an element which is contained in the form of a solid solution in the material to contribute to improvement in mechanical strength level and formability (especially the mechanical strength level) and to a decrease in density of the material. The Mg content is set to 2 to 6 wt %. If the Mg content is less than 2 wt %, Mg does not provide a sufficient effect; if the Mg content exceeds 6 wt %, a coarse Al-Mg compound is produced in the material to decrease the fatigue strength and corrosion resistance of the product to be formed.

Ti and B are elements which decrease the grain structure size of the material to improve the formability. The Ti and B contents are set to 0.005 to 0.2 wt % and 0.0005 to 0.02 wt %. respectively. If the Ti and/or B content is less than the lower limit, it does not provide a sufficient effect; if the Ti and/or B content exceeds the upper limit, a giant intermetallic compound is produced to degrade the formability.

The contents of Si, Fe, and Zn as impurities are set to 0.2 wt % or less, 0.2 wt % or less, and 0.5 wt % or less, respectively. If the content of any of these elements exceeds the preset value, ductility of the material is degraded to impair formability.

Mn, Cu, Cr, and Zr in the second aspect of the present invention are elements which contribute to improvement in mechanical strength level and formability of the material. The contents of the Mn, Cu, Cr, and Zr are set to 0.02 to 2.0 wt %, 0.01 to 2.0 wt %, 0.02 to 1.0 wt %, and 0.01 to 0.3 wt %, respectively. If the content of any one of these elements is less than the lower limit, it does not provide a sufficient effect; if exceeds the upper limit, no further effect can be expected, and a coarse compound is produced to degrade formability and decrease the mechanical strength of the product to be formed.

In the present invention, an anodized film is formed on a region of the pulley including at least the V grooves. This aims at preventing wear of the V grooves of the pulley by the frictional force of the belt. When wear of the V grooves of the pulley is prevented, the life of the pulley can be prolonged.

The Vickers hardness of the anodized film is set to 150 or more. If the Vickers hardness of the anodized film is less than 150, it does not provide a sufficient effect. Although not particularly specified, the upper limit of the Vickers hardness is about 430 due to manufacturing limitations.

The thickness of the anodized film is set 5 to 35 μm. If the thickness of the anodized film is less than 5 μm, it does not provide a sufficient effect; if it exceeds 35 μm, when the product is heated by heat generated during driving, surface microcracking occurs due to a difference in thermal expansion coefficient between the base material and the film to shorten the life of the pulley in the worst case.

In the V-grooved pulley according to the present invention, a hard anodized film is formed on at least the region including the V grooves, and an anodized film may be formed on the entire surface of the pulley.

To form an anodized film on the region of the pulley including V grooves, hard anodized aluminum treatment methods using various types of treatment agents, e.g., sulfuric acid, sulfuric acid-chromic acid, and the like may be appropriately selectively used considering conditions, e.g., the manufacturing cost and the axial load. The hardness and the thickness of the film are set by appropriately selecting the treatment conditions.

Examples of the present invention will be described in detail.

Alloys having compositions shown in Table 1 were cast in accordance with the conventional method. The obtained ingots were hot-rolled and cold-rolled to form plates each having a thickness of 3 mm. The plates were annealed at 360° C. for 4 hours to obtain respective plates to be formed.

Figure 2A:
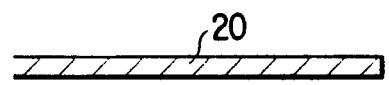
FIGS. 2A to 2E are sectional views for explaining the steps in manufacturing the V-grooved pulley.
Figure 2B:
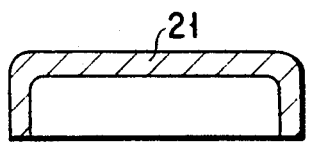
Figure 2C:
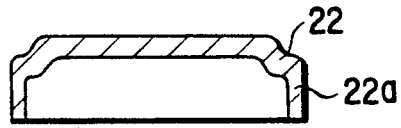
Figure 2D:
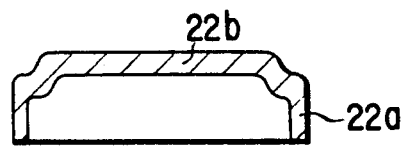
Figure 2E:
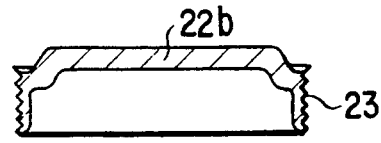

A circular plate having an outer diameter of 130 mm was punched from each obtained plate to be formed. The circular plate was subjected to the forming steps shown in FIGS. 2A to 2E to obtain a V-grooved pulley (outer diameter of 110 mm × width of 30 mm) having a multiple of V grooves. Table 2 shows the results of formation of the respective V-grooved pulleys. In Table 2, o indicates that formation was possible, and x indicates that formation was impossible.

The entire surface of each formed pulley including the V grooves was subjected to hard anodized aluminum treatment (anodization) while setting the Vickers hardness and the film thickness as shown in Table 2, thereby forming an anodized film on the pulley surface.

Each V-grooved pulley was subjected to the rotational bending fatigue test to check its axial load resistance and the wear amount of the side walls of the V-grooved portion by observing the section. In the rotational bending fatigue test, a pulley 5 to be measured and a driven pulley 6 were connected to each other by a belt 7, a predetermined axial load A was constantly applied to the pulley 5, and the damage to the pulley 5 was examined after 10,000,000 revolutions. At this time, the axial load resistance was measured by examining a maximum load not damaging the pulley to be measured when the pulley to be measured was set to accept a preset axial load, the speed of the pulley to be measured was set to 6,000 rpm, and the number of revolutions was set to 10,000,000. In order to obtain the wear amount of the side wall of the V-grooved portion, the section of the pulley to be measured was observed after the rotational bending fatigue test, and a decrease in thickness was obtained as the wear amount. Table 2 shows the results.

TABLE 1

| Alloy No. | Mg | Mn | Cu | Cr | Zr | Ti | B | Si | Fe | Zn | Al |
|---|---|---|---|---|---|---|---|---|---|---|---|
| Alloys According to present Invention | | | | | | | | | | | |
| 1 | 4.48 | — | — | — | — | 0.005 | 0.001 | 0.04 | 0.12 | 0.02 | Balance |
| 2 | 2.36 | — | — | 0.26 | — | 0.006 | — | 0.07 | 0.16 | 0.02 | " |
| 3 | 2.40 | 0.10 | — | — | 0.09 | 0.005 | 0.002 | 0.06 | 0.15 | 0.02 | " |
| 4 | 4.50 | 0.27 | — | — | — | 0.005 | — | 0.05 | 0.11 | 0.03 | " |
| 5 | 5.65 | — | 0.20 | — | — | 0.006 | — | 0.11 | 0.15 | 0.01 | " |
| Comparative Alloys | | | | | | | | | | | |
| 6 | 0.03 | 0.13 | — | — | — | 0.007 | — | 0.12 | 0.11 | 0.06 | " |
| 7 | 7.62 | 0.15 | 0.04 | — | — | 0.005 | — | 0.07 | 0.09 | 0.05 | " |
| 8 | 3.28 | 0.39 | — | — | — | 0.009 | 0.001 | 0.03 | 0.71 | 0.09 | " |
| 9 | 4.33 | — | 0.24 | — | — | 0.005 | — | 0.05 | 0.14 | 1.40 | " |
| 10 | 2.43 | 0.29 | 4.56 | — | — | 0.006 | — | 0.08 | 0.06 | 0.12 | " |
| 11 | 2.60 | 0.73 | — | — | — | 0.48 | 0.003 | 0.05 | 0.13 | 0.10 | " |

(wt %)

TABLE 2

| Test No. | Alloy No. | Formability | Hardness of Film Hv | Thickness of Film μm | Axial Load Resistance kgf | Decrease Thickness of V-Grooved Wall Portion μm |
|---|---|---|---|---|---|---|
| Products of Present Invention | | | | | | |
| 1 | 1 | o | 346 | 25 | 260 | 3 |
| 2 | 2 | o | 353 | 23 | 230 | 3 |
| 3 | 3 | o | 353 | 24 | 240 | 2 |

TABLE 2-continued

| Test No. | Alloy No. | Form-ability | Hardness of Film Hv | Thickness of Film μm | Axial Load Resistance kgf | Decrease Thickness of V-Grooved Wall Portion μm |
| --- | --- | --- | --- | --- | --- | --- |
| 4 | 4 | ∘ | 337 | 17 | 320 | 3 |
| 5 | 5 | ∘ | 314 | 15 | 320 | 4 |
| Comparative Products | | | | | | |
| 6 | 2 | ∘ | 353 | 3 | 230 | 48 |
| 7 | 2 | ∘ | 107 | 27 | 230 | 32 |
| 8 | 6 | ∘ | 365 | 40 | 60 | 16 |
| 9 | 7 | x | — | — | — | — |
| 10 | 8 | x | — | — | — | — |
| 11 | 9 | x | — | — | — | — |
| 12 | 10 | x | — | — | — | — |
| 13 | 11 | x | — | — | — | — |

As is apparent from Tables 1 and 2, each alloy according to the present invention can be formed easily and has a high rotational bending fatigue resistance. Also, since a decrease in thickness of the side wall of the V-grooved portion is small, each lightweight V-grooved pulley of the present invention apparently has excellent wear resistance.

In contrast to this, when an aluminum alloy having a composition outside the scope of the present invention was used, a lightweight V-grooved pulley could not be formed. Even if a lightweight V-grooved pulley was formed by using an aluminum alloy (No. 8) having a composition outside the scope of the present invention, it had a low axial load resistance. Each of a pulley having a thin anodized film (No. 6) and a pulley having a small film hardness value (No. 7) had a large decrease in thickness of the side wall of the V-grooved portion.

Regarding the weight reduction, when a V-grooved pulley having the same size (outer diameter 110 mm×width 30 mm) was formed from a cold-rolled steel plate as the conventional material, its weight was 268 g. In contrast to this, a V-grooved pulley according to the present invention (outer diameter of 100 mm×width of 30 mm) had a weight of 100 g, enabling a great weight reduction.

As has been described above, according to the present invention, a lightweight pulley having a high mechanical strength, and particularly a high rotational bending fatigue resistance, and easily formed by drawing, deep drawing, rotational forming, and the like, in which the V-grooved portion has excellent wear resistance can be obtained.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A lightweight V-grooved pulley obtained from a metal plate and having a cylindrical member with one open end, the cylindrical member having a circumferential surface formed with at least one groove having a substantially V-shaped section, wherein
 a material of said metal plate essentially consists of an aluminum alloy containing 2 to 6 wt % of Mg, at least one of 0.005 to 0.2 wt % of Ti and 0.0005 to 0.02 wt % of B, impurities containing not more than 0.2 wt % of Si, not more than 0.2 wt % of Fe, and not more than 0.5 wt % of Zn, and a balance consisting of Al and an inevitable impurity, and an anodized film is formed on a region including the groove.

2. A pulley according to claim 1, wherein said anodized film has a Vickers hardness of not less than 150.

3. A pulley according to claim 1, wherein said anodized film has a thickness of 5 to 35 μm.

4. A lightweight V-grooved pulley obtained from a metal plate and having a cylindrical member with one open end, the cylindrical member having a circumferential surface formed with at least one groove having a substantially V-shaped section, wherein
 a material of said metal plate essentially consists of an aluminum alloy containing 2 to 6 wt % of Mg, at least one element selected from the group consisting of 0.01 to 2.0 wt % of Cu, 0.02 to 1.0 wt % of Cr, and 0.01 to 0.3 wt % of Zr, at least one of 0.005 to 0.2 wt % of Ti and 0.0005 to 0.02 wt % of B, impurities containing not more than 0.2 wt % of Si, not more than 0.2 wt % of Fe, and not more than 0.5 wt % of Zn, and a balance consisting of Al and an inevitable impurity, and an anodized film is formed on a region including the groove.

5. A pulley according to claim 4, wherein said anodized film has a Vickers hardness of not less than 150.

6. A pulley according to claim 4, wherein said anodized film has a thickness of 5 to 35 μm.

* * * * *